(12) United States Patent
Iijima

(10) Patent No.: US 11,480,546 B2
(45) Date of Patent: Oct. 25, 2022

(54) MAGNETIC MATERIAL INSPECTION SYSTEM, MAGNETIC MATERIAL INSPECTION DEVICE, AND MAGNETIC MATERIAL INSPECTION METHOD

(71) Applicant: Shimadzu Corporation, Kyoto (JP)

(72) Inventor: Kenji Iijima, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 35 days.

(21) Appl. No.: 17/133,490

(22) Filed: Dec. 23, 2020

(65) Prior Publication Data

US 2022/0196599 A1    Jun. 23, 2022

(51) Int. Cl.
*G01N 27/82* (2006.01)

(52) U.S. Cl.
CPC ............................ *G01N 27/82* (2013.01)

(58) Field of Classification Search
CPC ................................................ G01N 27/82
See application file for complete search history.

(56) References Cited

U.S. PATENT DOCUMENTS

| | | |
|---|---|---|
| 5,570,017 A | 10/1996 | Blum |
| 5,847,563 A | 12/1998 | Blum |
| 2012/0209105 A1* | 8/2012 | Tanii .................. G01R 33/1269 600/409 |
| 2018/0299408 A1* | 10/2018 | Yoshioka ............... G01N 27/87 |
| 2019/0293603 A1* | 9/2019 | Itoi ........................ G01N 27/83 |
| 2019/0360965 A1* | 11/2019 | Iijima ..................... G01N 27/83 |
| 2020/0300811 A1 | 9/2020 | Hashime et al. |

FOREIGN PATENT DOCUMENTS

| | | |
|---|---|---|
| JP | H06-317563 A | 11/1994 |
| JP | H10-332542 A | 12/1998 |
| JP | 2019-105507 A | 6/2019 |
| WO | 2018-109824 A1 | 6/2018 |

OTHER PUBLICATIONS

Notice of Reasons for Refusal for corresponding Japanese Patent Application No. 2018-131810, dated Nov. 24, 2021, submitted with a machine translation.

* cited by examiner

*Primary Examiner* — Dominic E Hawkins
(74) *Attorney, Agent, or Firm* — Muir Patent Law, PLLC

(57) ABSTRACT

A magnetic body inspection system includes a processing unit for extracting a feature amount from a measured damage waveform and determining the type of damage to a magnetic body based on a comparison between the extracted feature amount and a feature amount stored in advance in a storage unit.

17 Claims, 3 Drawing Sheets

MAGNETIC MATERIAL INSPECTION SYSTEM, MAGNETIC MATERIAL INSPECTION DEVICE, AND MAGNETIC MATERIAL INSPECTION METHOD

CROSS-REFERENCE TO RELATED APPLICATIONS

The related application number JP2018-131810, entitled "Magnetic Body Inspection System, Magnetic Body Inspection Device, And Magnetic Body Inspection Method", filed on Jul. 11, 2018, Kenji Iijima, upon which this patent application is based is hereby incorporated by reference.

BACKGROUND OF THE INVENTION

Field of the Invention

The present invention relates to a magnetic body inspection system, a magnetic body inspection device, and a magnetic body inspection method, in particular to a magnetic body inspection system, a magnetic body inspection device, and a magnetic body inspection method for detecting a magnetic flux of a magnetic body.

Description of the Background Art

Conventionally, a magnetic body inspection device that detects a magnetic flux of a magnetic body is known. Such an apparatus is disclosed in, for example, Japanese Unexamined Patent Application Publication No. H10-332542.

The above-described Japanese Unexamined Patent Application Publication No. H10-332542 discloses a steel wire rope detection device (magnetic body inspection device) for detecting damage (disconnection) of a steel wire rope. This steel wire rope disconnection detection device detects (measures) a magnetic flux of a steel wire rope by a detection coil while moving the detection coil with respect to a steel wire rope which is an inspection target with the steel wire rope magnetized. This steel wire rope disconnection detection device determines whether or not damage is present by comparing a measurement waveform value with a threshold.

However, in a steel wire rope disconnection detection device described in the above-described Japanese Unexamined Patent Application Publication No. H10-332542, it is possible to determine whether or not damage to a steel wire rope is present, but the type of the damage to the steel wire rope (magnetic body) cannot be determined.

SUMMARY OF THE INVENTION

The present invention has been made to solve the above-described problems, and an object of the present invention is to provide a magnetic body inspection system, a magnetic body inspection device, and a magnetic body inspection method capable of easily determining the type of damage to a magnetic body.

In order to achieve the above-described object, as a result of intensive study, the inventor of this application has acquired a new finding that a feature amount of a damage waveform changes according to the type of the damage to the magnetic body in the damage waveform indicating the damage to the magnetic body. The magnetic body inspection system according to the first aspect of the present invention determines the type of the damage to the magnetic body by using the new finding.

That is, the magnetic body inspection system according to a first aspect of the present invention includes:
a magnetic body inspection device configured to acquire a measurement waveform by detecting a magnetic flux of a magnetic body by a detection unit while relatively moving the detection unit with respect to the magnetic body;
a storage unit configured to store a relation between a feature amount of a damage waveform indicating damage to the magnetic body in the measurement waveform and a type of damage in advance; and
a processing unit configured to extract the feature amount of the measured damage waveform and determine the type of the damage to the magnetic body based on a comparison between the extracted feature amount and the feature amount stored in the storage unit in advance.

In the magnetic body inspection system according to the first aspect of the present invention, by configuring as described above, when determining the type of damage to a magnetic body, it is possible to easily determine the type of damage to the magnetic body by utilizing the fact that the feature amount of the damage waveform changes according to the type of the damage to the magnetic body. As a result, it is possible to provide a magnetic body inspection system capable of easily determining the type of damage to the magnetic body.

Further, in the magnetic body inspection system according to the first aspect of the present invention, preferably, the processing unit is configured to extract at least one of a length of the damage waveform in a time axis direction and polarity of the damage waveform as the feature amount from the damage waveform.

With this configuration, in the case of determining the type of damage to a magnetic body by extracting the length of a damage waveform in the time axis direction, it is possible to easily determine the type of damage to the magnetic body by utilizing the fact that the length of the damage waveform in the time axis direction differs depending on the type of damage to the magnetic body. Further, in the case of determining the type of damage to the magnetic body by extracting the feature amount of the polarity of the damage waveform, it is possible to easily determine the type of damage to the magnetic body by utilizing the fact that the polarity of the damage waveform differs depending on the type of damage to the magnetic body.

In the configuration in which the type of damage to the magnetic body is determined based on at least one of the length of the damage waveform in the time axis direction and the polarity of the damage waveform, preferably, the magnetic body is a wire rope formed of a plurality of wires, and the processing unit is configured to determine that the type of the damage to the wire rope is damage to the wire rope due to a disconnection of the wire or damage to the wire rope other than the damage to the wire rope due to a disconnection of the wire, based on the length of the damage waveform in the time axis direction and the polarity of the damage waveform.

Here, the inventor has acquired a new finding that in the case of damage to a wire rope by a disconnection of the wire, the damaged area is relatively small, and therefore the length of the damage waveform in the time axis direction is relatively small. The inventor of this application has also acquired a new finding that the damage to the wire rope due to a disconnection of the wire results in a reduced cross-sectional area of the wire rope, reducing the magnetic flux, and therefore the damage waveform exhibits a characteristic polarity corresponding to this reduction in the magnetic flux. Therefore, by configuring as described above, in the case of a damage waveform indicating the damage to the wire rope due to a strand disconnection, by utilizing the fact that the length of the damage waveform in the time axis direction is relatively small and a characteristic polarity corresponding to the reduction of the magnetic flux is exhibited, it is possible to easily determine that the type of damage to the wire rope is damage other than the damage to the wire rope due to a strand disconnection or damage to the wire rope due to a strand disconnection.

In this case, preferably, the processing unit is configured to determine that the type of the damage to the wire rope is damage to the wire rope due to a disconnection of the wire or damage to the wire rope other than the damage to the wire rope due to adhesion of a magnetic foreign matter, based on the length of the damage waveform in the time axis direction and the polarity of the damage waveform, and the processing unit is configured to determine that the type of the damage to the wire rope is damage to the wire rope due to elongation with plastic deformation based on the length of the damage waveform in the time axis direction.

Here, the present inventor has acquired a new finding that in the case of damage to a wire rope due to adhesion of a magnetic foreign matter such as a piece, the damaged area is relatively small, and therefore the length of the damage waveform in the time axis direction is relatively small. Further, the inventor of this application has acquired a new finding that in the case of damage to a wire rope due to adhesion of a magnetic foreign matter, the cross-sectional area of the wire rope is increased, causing an increased magnetic flux, and therefore the damage waveform exhibits a characteristic polarity corresponding to the increase in the magnetic flux.

Therefore, by configuring as described above, by utilizing the fact that in the damage waveform indicating damage to a wire rope due to adhesion of a magnetic foreign matter, the length of the damage waveform in the time axis direction is relatively small and a characteristic polarity corresponding to the increase in the magnetic flux is exhibited and the fact that in the damage waveform indicating damage to a wire rope due to a wire disconnection, the length of the waveform in the time axis direction is relatively small and a characteristic polarity corresponding to the decrease in the magnetic flux is exhibited, it is possible to easily determine that the type of damage to a wire rope is damage to a wire rope due to a wire disconnection or damage to a wire rope due to adhesion of a magnetic foreign matter.

The present inventor has also acquired a new finding that in a case of damage to a wire rope caused by elongation with plastic deformation due to a kink or the like, the damaged area is relatively large and the length of the damage waveform in the time axis direction is relatively large. Therefore, by configuring as described above, by utilizing the fact that the length of the damage waveform in the time axis direction is relatively large in the damage waveform indicating damage to a wire rope caused by elongation with plastic deformation, it is possible to easily determine that the type of damage to the wire rope is damage to the wire rope caused by elongation with plastic deformation.

In the configuration in which the type of damage to a magnetic body is determined based on at least one of the length of the damage waveform in the time axis direction and the polarity of the damage waveform, preferably, the detection unit includes a differential coil, and the processing unit is configured to determine the type of the damage to the magnetic body based on at least one of the length of the damage waveform in the time axis direction and the polarity of the damage waveform detected by the differential coil of the detection unit.

With this configuration, it is possible to determine the type of damage to a wire rope based on a damage waveform small in the noise which is acquired by the differential coil, and therefore it is possible to determine the type of damage to the wire rope with higher accuracy. Further, the inventor has found the fact that it is possible to easily discriminate between the damage to the magnetic body caused by a disconnection of the wire and the damage to the magnetic body caused by adhesion of a magnetic foreign matter by using a differential coil.

In the configuration in which the detection unit includes a differential coil, preferably, the damage waveform is a both-side waveform having two waveform portions opposite in polarity to each other, and the processing unit is configured to determine the type of the damage to the magnetic body based on at least one of a length of the both-side waveform in the time axis direction as the damage waveform and an order of polarity of the both-side waveform as the damage waveform.

The inventor of this application has acquired a finding that the type of damage of a magnetic body can be easily determined with the above-described configuration by utilizing the fact that the length of the damage waveform as a both-side waveform in the time axis direction differs depending on the type of damage to the magnetic body, or the fact that the order of polarity of the both-side waveform as a damage waveform differs depending on the type of damage to a magnetic body.

In the configuration in which the detection unit includes a differential coil, preferably, the damage waveform is an integrated waveform having a single mountain shape acquired by integrating the both-side waveform having two waveform portions opposite in the polarity to each other in the time axis direction, and the processing unit is configured to determine the type of the damage to the magnetic body based on at least one of the length of the integrated waveform in the time axis direction length as the damage waveform and the polarity of the integrated waveform as the damage waveform.

The inventor of this application has acquired a finding that the type of damage to a magnetic body can be easily determined with the above-described configuration by utilizing the fact that the length of the integrated waveform as a damage waveform in the time axis direction differs depending on the type of damage to the magnetic body, or the fact that the polarity of the integrated waveform as a damage waveform differs depending on the type of damage to the magnetic body.

A magnetic body inspection device according to the second aspect of the present invention includes:

a detection unit configured to acquire a measurement waveform by detecting a magnetic flux of the magnetic body while being relatively moved relative to the magnetic body;

a storage unit configured to store a relation between a feature amount of a damage waveform indicating damage to the magnetic body in the measured waveform and the type of the damage; and a processing unit configured to extract a feature amount from a measured damage waveform and determine the type of the damage to the magnetic body based on a comparison between the extracted feature amount and a feature amount stored in the storage in advance.

In the magnetic body inspection device according to the second aspect of the present invention, by configuring as described above, in the same manner as in the magnetic body inspection system according to the first aspect of the present invention, it is possible to provide a magnetic body inspection device capable of easily determining the type of damage to a magnetic body based on new findings by the inventor of the present invention.

The magnetic body inspection method according to the third aspect of the present invention, includes:

a step of acquiring a measurement waveform by detecting a magnetic flux of a magnetic body by a detection unit while relatively moving the detection unit with respect to the magnetic body;

a step of extracting a feature amount from a damage waveform indicating damage to the magnetic body in the acquired measurement waveform; and a step of determining the type of the damage to the magnetic body based on a comparison between the extracted feature amount and a feature amount stored in the storage unit in advance in the storage storing the relation between the feature amount of the damage waveform and the type of damage in advance.

In the magnetic body inspection method according to the third aspect of the present invention, by configuring as described above, in the same manner as in the magnetic body inspection system according to the first aspect of the present invention, it is possible to provide a magnetic body inspection method capable of easily determining the type of damage to a magnetic body based on the new findings by the inventor of the present invention.

DESCRIPTION OF THE PREFERRED EMBODIMENT

Hereinafter, embodiments in which the present invention is embodied will be described with reference to the attached drawings.

First Embodiment

With reference to FIG. 1 to FIG. 4, the configuration of a magnetic body inspection system 300 according to a first embodiment will be described.

(Configuration of Magnetic Body Inspection System)

Figure 1:
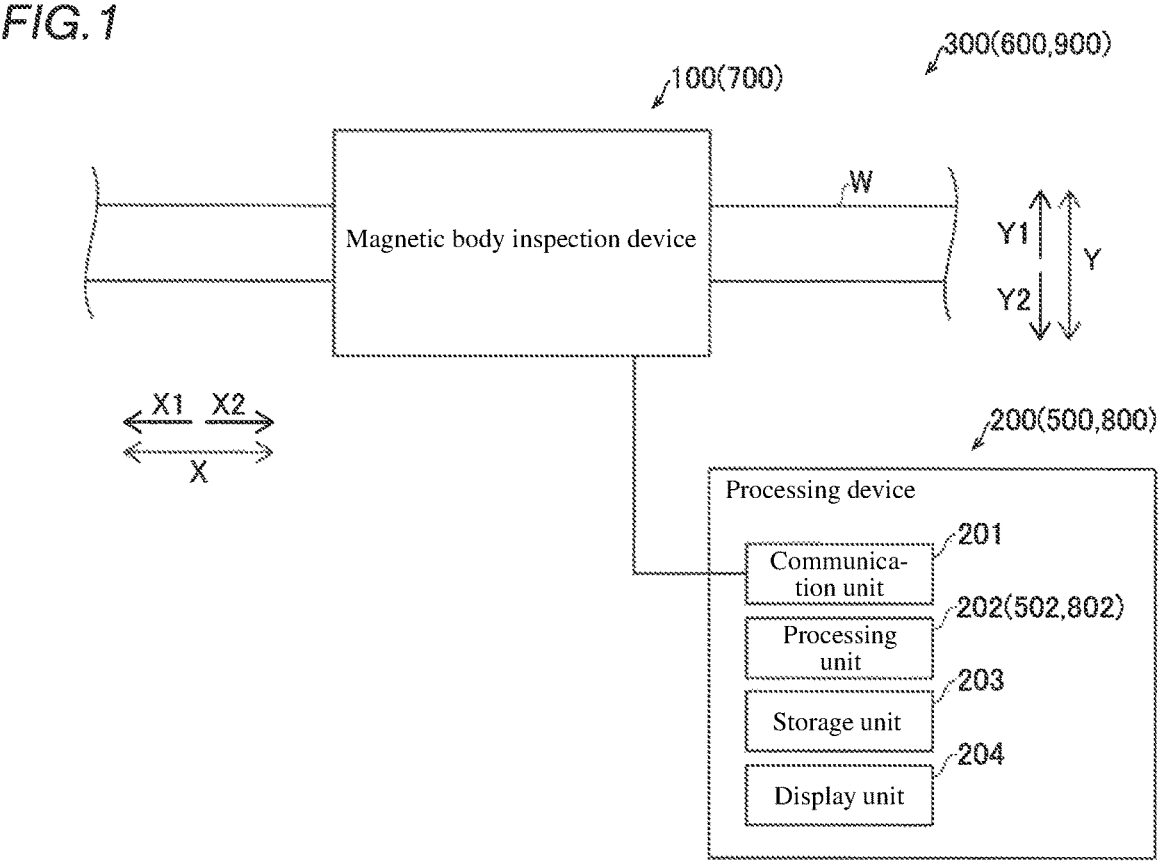
FIG. 1 is a schematic diagram showing the configuration of a magnetic body inspection system according to first to third embodiments.

As shown in FIG. 1, the magnetic body inspection system 300 is a system for inspecting damage (disconnection of the wire, etc.) to a wire rope W, which is an inspection target and a magnetic body. The magnetic body inspection system 300 is provided with a magnetic body inspection device 100 for measuring a magnetic flux of the wire rope W and a processing device 200 for performing a display of a measurement result of magnetic flux of the wire rope W by the magnetic body inspection device 100 and performing an analysis based on the measurement result of the wire rope W by the magnetic body inspection device 100. The damage to the wire rope W which is difficult to visually confirm can be confirmed by inspecting the damage to the wire rope W with the magnetic body inspection system 300. Note that the wire rope W is an example of the "magnetic body" recited in claims.

A wire rope W is used for, e.g., cranes, elevators, suspension bridges, robotics, etc. A wire rope W is formed by a plurality of wires having magnetism. Specifically, a wire rope W is formed by braiding (e.g., strand-braiding) a plurality of wires. The wire rope W is a magnetic body formed of an elongated member extending in an X-direction. The wire rope W is monitored by the magnetic body inspection device 100 to prevent a disconnection or severing due to deterioration. As a result of the measurement of the magnetic flux, the wire rope W determined that the degree of deterioration has exceeded a predetermined criterion is replaced by an operator.

The wire rope W is arranged to extend in the X-direction at the position of the magnetic body inspection device 100. The magnetic body inspection device 100 measures the magnetic flux of the wire rope W while moving in the X direction (in the longitudinal direction of the wire rope W) relative to the wire rope W along the surface of the wire rope W.

For example, as in the wire rope W used in a crane or an elevator, in a case where a wire rope W itself moves, the magnetic flux measurement of the wire rope W by the magnetic body inspection device 100 is performed while moving the wire rope W in the X direction in a state in which the magnetic body inspection device 100 is fixed with respect to the wire rope W.

Also, in a case where a wire rope W itself does not move, like the wire rope W used in a suspension bridge, the magnetic flux measurement of the wire rope W is performed by the magnetic body inspection device 100 while moving the magnetic body inspection device 100 in the X-direction in a state in which the wire rope W is fixed with respect to the magnetic body inspection device 100. Thus, the magnetic flux at each position of the wire rope W is measured.

Figure 2:
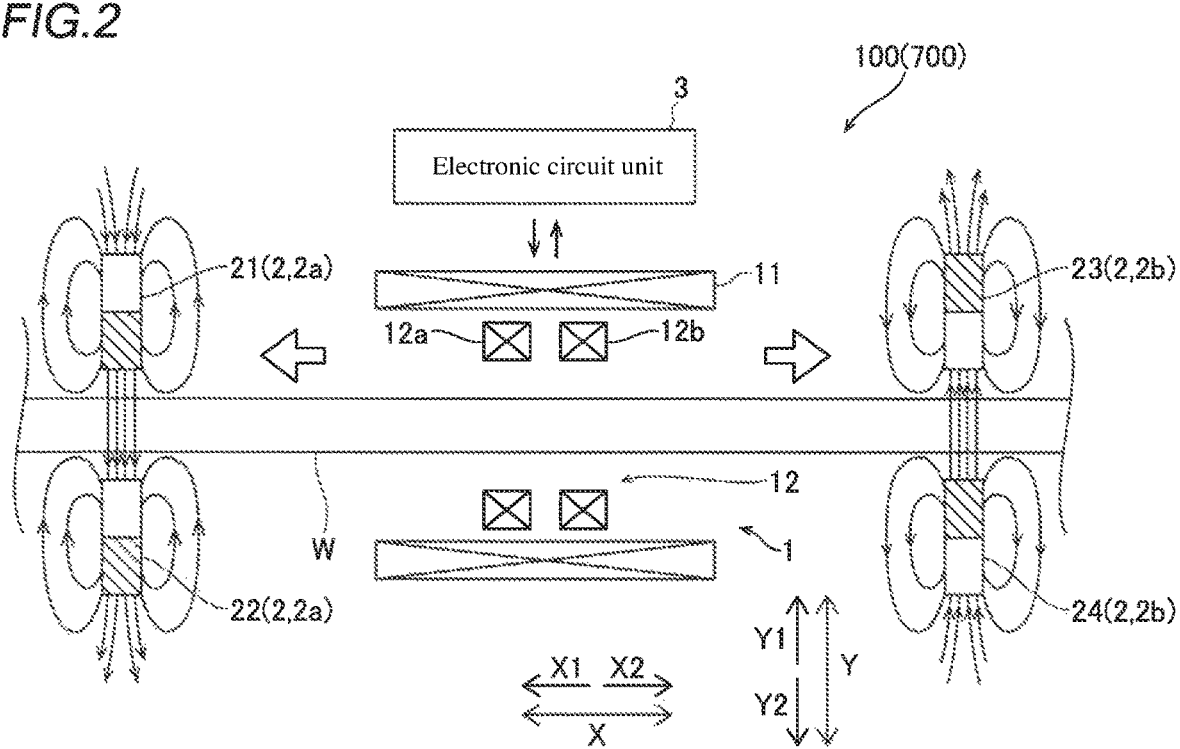
FIG. 2 is a diagram showing the configuration of the magnetic body inspection device according to the first to third embodiments.
Figure 3:
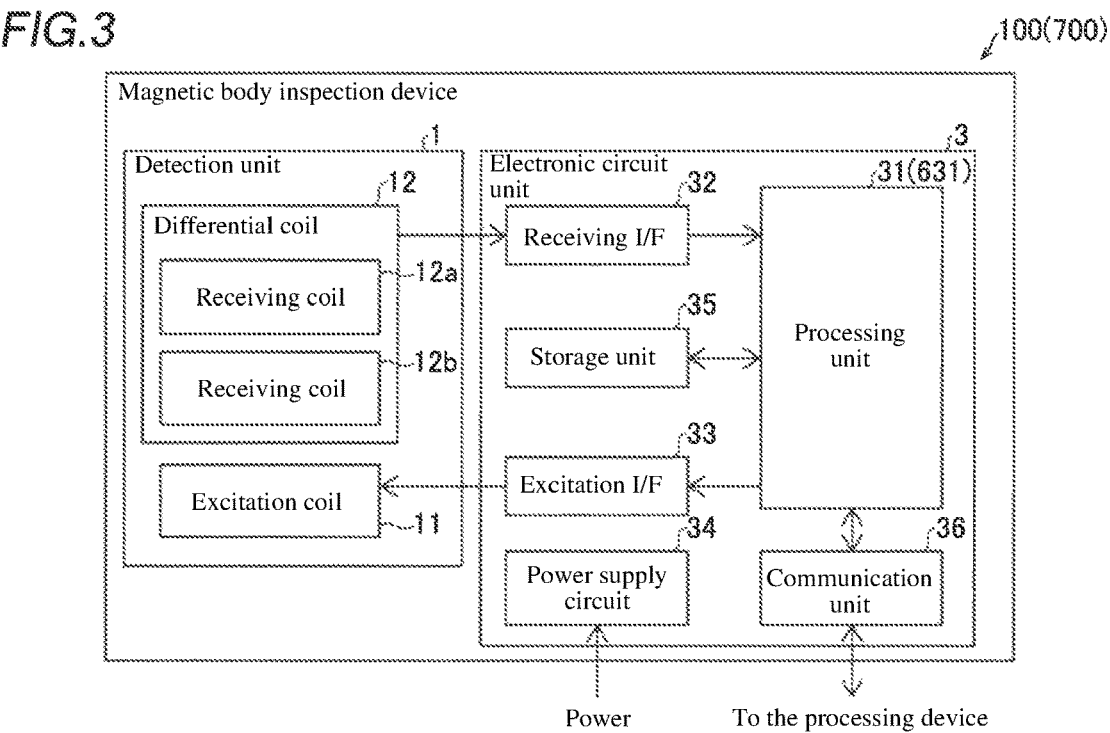
FIG. 3 is a block diagram showing a control configuration of the magnetic body inspection device according to the first to third embodiments.

As shown in FIG. 2 and FIG. 3, the magnetic body inspection device 100 is provided with a detection unit 1, a magnetic field application unit 2 (see FIG. 2), and an electronic circuit unit 3.

The detection unit 1 detects (measures) the magnetic flux of the wire rope W. Specifically, the detection unit 1 includes an excitation coil 11 and a differential coil 12 having a pair of receiving coils 12a and 12b.

The excitation coil 11 excites the state of magnetization of the wire rope W. The excitation coil 11 is acquired by winding a conducting wire multiple times and arranged around the axis of the wire rope W so as to surround the wire rope W. The excitation coil 11 generates a magnetic field along the X-direction (in the longitudinal direction of the wire rope W in the axial direction) inside thereof (inside the ring) when excitation alternating current flows to apply the generated magnetic field to the wire rope W arranged inside the excitation coil 11.

The differential coil 12 (receiving coils 12a and 12b) detects (measures) the magnetic flux of the wire rope W in the X-direction to which a magnetic field is applied by the excitation coil 11. The receiving coils 12a and 12b of the differential coil 12 are each acquired by winding a conductive wire plural times and differentially connected to each other. The receiving coils 12a and 12b of the differential coil 12 are arranged around the axis of the wire rope W so as to surround the wire rope W. The receiving coils 12a and 12b of the differential coil 12 detect the magnetic flux (total magnetic flux) in the X-direction in the wire rope W arranged inside thereof (inside the ring) while being moved in the X-direction relative to the wire rope W. The differential coil 12 transmits a differential signal (detection signal) as a voltage in response to the detected magnetic flux of the wire rope W in the X-direction. The differential signal is a signal indicating the difference between the signal from the receiving coil 12a and the signal from the receiving coil 12b.

For example, the differential coil 12 transmits a differential signal having a value of approximately zero in a case where both the receiving coils 12a and 12b are positioned at the normal positions of the wire rope W (where there is no damage). This is because in the normal portion of the wire rope W, the total magnetic flux (the value acquired by multiplying the intensity of the magnetic field by the magnetic permeability and the area) of the wire rope W is substantially the same. Further, for example, in a case where one of the receiving coils 12a and 12b is positioned at a damaged portion of the wire rope W and the other is positioned at a normal portion of the wire rope W, the differential coil 12 transmits a differential signal (see FIG. 4) having a relatively large value (fluctuating value). This is because the total magnetic flux at the damaged portion of the wire rope W differs from the total magnetic flux at the normal portion of the wire rope W.

As described above, with the differential coil 12, it is possible to acquire a signal indicating the damaged portion of the wire rope W (damage waveform Wd (see FIG. 4)). The damage waveform Wd is a both-side waveform (a waveform including an upper convex wave portion and a lower convex wave portion) having two waveforms opposite in the polarity to each other. Further, in the differential coil 12, by taking the difference between the signal of the receiving coil 12a and the signal of the receiving coil 12b, it is possible to cancel the noise. Therefore, it is possible to acquire a signal with a good S/N ratio.

The magnetic body inspection device 100 acquires a measurement waveform by detecting (measuring) the magnetic flux of the wire rope W by the differential coil 12 of the detection unit 1 while moving the differential coil 12 of the detection unit 1 relative to the wire rope W in the X-direction.

Further, the differential coil 12 is provided inside the excitation coil 11 (inside the ring). Note that the differential coil 12 may be provided outside the excitation coil 11 (outside the ring). The receiving coils 12a and 12b of the differential coil 12 are arranged along the X-direction in this order from the X1-direction side toward the X2-direction side.

The magnetic field application unit 2 is configured to adjust the magnitude and the direction of the magnetization of the wire rope W before detecting the magnetic flux of the wire rope W by the detection unit 1. With this, at the time of detecting the magnetic flux of the wire rope W by the detection unit 1, it is possible to suppress the occurrence of noise due to the disturbance of magnetization. Further, the magnetic flux changes due to components (magnetization, slight bending, etc.) without plastic deformation can be removed in advance. The magnetic field application unit 2 adjusts the magnitude and the direction of the magnetization of the magnetic body by applying a magnetic field in the Y-direction (in a direction perpendicular to the longitudinal direction of the wire rope W) with respect to the wire rope W.

The magnetic field application unit 2 includes a first magnetic field application unit 2a having magnets 21 and 22 and a second magnetic field application unit 2b having magnets 23 and 24. The first magnetic field application unit 2a (magnets 21 and 22) is arranged on the X1-direction side (one side of the wire rope W in the longitudinal direction) with respect to the detection unit 1. Further, the second magnetic field application unit 2b (magnets 23 and 24) is arranged on the the X2-direction side (the other side of the wire rope W in the longitudinal direction) with respect to the detection unit 1. The first magnetic field application unit 2a is configured to apply a magnetic field in the Y2-direction by the magnets 21 and 22. The second magnetic field application unit 2b is configured to apply a magnetic field in the Y1-direction by the magnets 23 and 24.

As shown in FIG. 3, the electronic circuit unit 3 includes a processing unit 31, a receiving I/F (interface) 32, an excitation I/F 33, a power supply circuit 34, a storage unit 35, and a communication unit 36. The processing unit 31 is configured to control each part of the magnetic body inspection device 100.

The processing unit 31 includes a processor, such as, e.g., a CPU (Central processing unit), a memory, an AD converter, and the like. The receiving I/F 32 receives the differential signal from the differential coil 12 and transmits it to the processing unit 31. The receiving I/F 32 includes an amplifier. The receiving I/F 32 amplifies the differential signal from the differential coil 12 by the amplifier and transmits the amplified signal to the processing unit 31. The excitation I/F 33 receives a control signal from the processing unit 31 and controls the power supply to the excitation coil 11 based on the received control signal. The power supply circuit 34 receives power from the outside and supplies the power to each part of the magnetic body inspection device 100, such as the excitation coil 11. The storage unit 35 is a storage medium including, for example, a flash memory, and stores data such as measurement results (measurement data) of the wire rope W. The communication unit 36 is an interface for communication and connects the magnetic body inspection device 100 and the processing device 200 to be able to communicate with each other.

As shown in FIG. 1, the processing device 200 includes a communication unit 201, a processing unit 202, a storage unit 203, and a display unit 204.

The communication unit 201 is an interface for communication and connects the magnetic body inspection device 100 and the processing device 200 to be able to communicate with each other. The processing device 200 receives the measurement result of the wire rope W (measured data) by the magnetic body inspection device 100 via the communication unit 201.

The processing unit 202 controls each part of the processing device 200. The processing unit 202 includes a processor, such as a CPU, a memory, and the like. The processing unit 202 analyzes the damage of the wire rope W, such as the disconnection of the wire, based on the measurement result of the wire rope W received via the communication unit 201.

The storage unit 203 is a storage medium including, for example, a flash memory, and stores the information, such as, e.g., the measurement result of the wire rope W and the analysis result of the measurement result of the wire rope W by the processing unit 202.

The display unit 204 is, e.g., a liquid crystal monitor, and displays the information, such as, e.g., the measurement result of the wire rope W and the analysis result of the measurement result of the wire rope W by the processing unit 202.

(Configuration for Determining Type of Damage)

Figure 4:
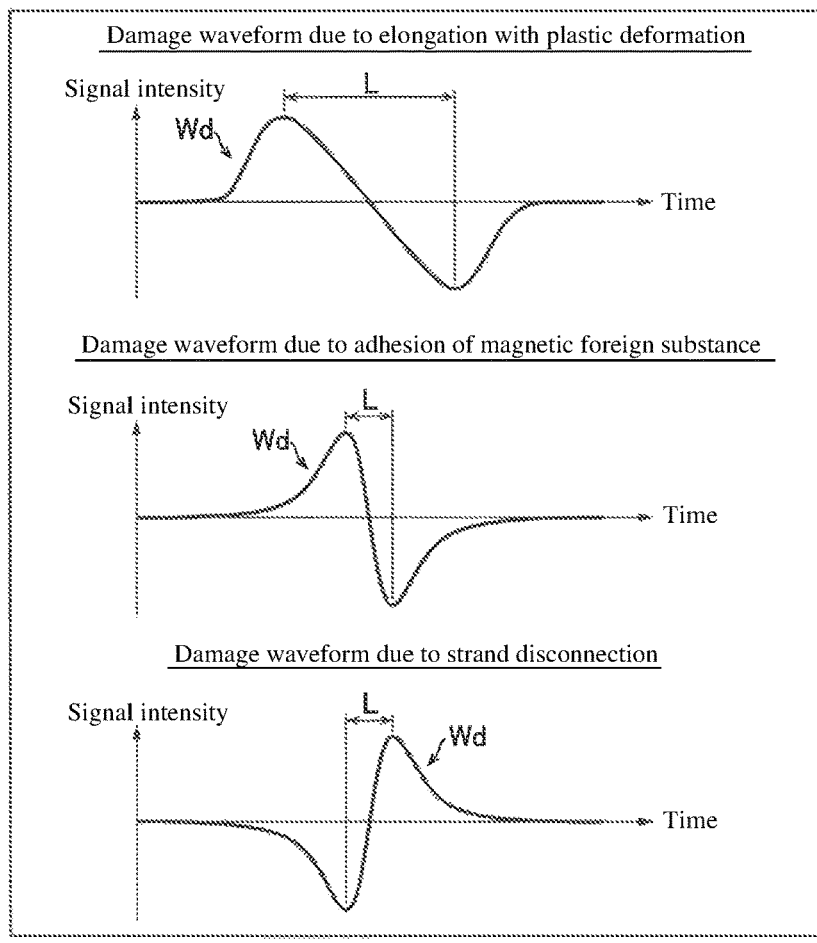
FIG. 4 is a diagram showing a both-side waveform as a damage waveform.

FIG. 4 shows a graph of a damage waveform Wd among measurement waveforms. The vertical axis indicates the signal intensity (volts, etc.). The horizontal axis indicates the time axis showing the relative movement amount between the wire rope W and the differential coil 12 of the detection unit 1 at the time of measurement.

Here, in the first embodiment, the storage unit 203 is storing in advance the relation between the type of damage and the feature amount of a damage waveform Wd indicating damage to the wire rope W among measurement waveforms.

Further, as shown in FIG. 4, the processing unit 202 of the processing device 200 extracts the feature amount from the measured damage waveform Wd, and determines (estimates) the type of damage to the wire rope W, based on the comparison between the extracted feature amount and the feature amount stored in advance in the storage unit 203. The processing unit 202 of the processing device 200 extracts, as a feature amount, at least one of the length L of the damage waveform Wd in the time axis direction and the polarity of the damage waveform Wd from the damage waveform Wd.

Further, the processing unit 202 of the processing device 200 determines (estimates) the type of damage to the wire rope W based on at least one of the length L of the damage waveform Wd extracted as a feature amount in the time axis direction and the polarity of the damage waveform Wd. Specifically, based on at least one of the length L of of the both-side waveform as a damage waveform Wd in the time axis direction and the order of polarity of the both-side waveform as a damage waveform Wd, the processing unit 202 of the processing device 200 determines the type of damage to the wire rope W. The length L of the both-side waveform as a damage waveform Wd in the time axis direction is, for example, the length between the peaks of the two waveform portions of the both-side waveform.

For example, the processing unit 202 of the processing device 200 determines that the type of damage to the wire rope W is damage to the wire rope W due to elongation with plastic deformation, based on the length L of the damage waveform Wd in the time axis direction. When the length L of the damage waveform Wd in the time axis direction is equal to or greater than a predetermined first threshold, the processing unit 202 of the processing device 200 determines that the type of damage to the wire rope W is damage to the wire rope W due to elongation with plastic deformation.

The first threshold is a value determined based on measurement results acquired in advance by the same moving speed and arrangement of the detection unit 1 (differential coil 12) as those at the time of the actual inspection. When an actual inspection is performed by a moving speed different from the moving speed the time of the measurement, the first threshold may be used by correcting it by proportional calculation.

Further, for example, the processing unit 202 of the processing device 200 determines that the type of damage to the wire rope W is damage to the wire rope W due to adhesion of a magnetic foreign matter, based on the length L of the damage waveform Wd in the time axis direction and the polarity of the damage waveform Wd.

The processing unit 202 of the processing device 200 determines that the type of damage to the wire rope W is damage to the wire rope W due to adhesion of a magnetic substance when the length L of the damage waveform Wd in the time axis direction is less than a predetermined second threshold (<the first threshold) and the order of polarity of the both-side waveform as a damage waveform Wd is a predetermined first order (in FIG. 4, in the order of the upward convex and the downward convex). The second threshold value is a value acquired in advance by experiments or the like.

For example, the processing unit 202 of the processing device 200 determines that the type of damage to the wire rope W is damage to the wire rope W due to a disconnection of the wire, based on the length L of the damage waveform Wd in the time axis direction and the polarity of the damage waveform Wd.

The processing unit 202 of the processing device 200 determines that the type of damage to the wire rope W is damage to the wire rope W due to a disconnection of the wire when the length L of the damage waveform Wd in the time axis direction is less than a predetermined second threshold and the order of polarity of the both-side waveform as a damage waveform Wd is a predetermined second order (in FIG. 4, in the order of the downward convex and the upward convex, i.e., the order opposite to the first order).

In the case of damage to the wire rope W caused by elongation with plastic deformation due to a kink or the like, as compared with the damage to the wire rope W due to adhesion of a magnetic foreign matter or a disconnection of the wire, the length L of the damage waveform Wd in the time axis direction is about several times. This is because in the case of damage to the wire rope W caused by the elongation with plastic deformation due to a kink or the like, the scope of the damage is large as compared with local damage, such as, e.g., damage to the wire rope W caused by adhesion of a magnetic foreign matter and a disconnection of the wire.

Therefore, the processing unit 202 of the processing device 200 can determine, based on the length L of the damage waveform Wd in the time axis direction, that the type of damage to the wire rope W is which of the damage caused by elongation with plastic deformation and the damage other than damage to the wire rope caused by elongation with plastic deformation (damage to the wire rope W due to adhesion of a magnetic foreign matter or a disconnection of the wire).

Similarly, the processing unit 202 of the processing device 200 can determine, based on the length L of the damage waveform Wd in the time axis direction, whether the type of damage to the wire rope W is which of the damage to the wire rope W caused by adhesion of a magnetic foreign matter or a disconnection of the wire and the damage (damage to the wire rope W caused by elongation with plastic deformation) other than damage to the wire rope W caused by adhesion of a magnetic foreign matter or a disconnection of the wire.

Note that it is considered that the length L of the damage waveform Wd in the time axis direction differs depending on the type of the wire rope W (thickness, etc.). Therefore, in cases where the magnetic body inspection device 100 is configured to be able to inspect a plurality of wire ropes W different in type from each other, a first threshold and a second threshold for each type of a wire rope W that can be inspected by the magnetic body inspection device 100 may be stored in the storage unit 203 of the processing device 200.

Further, in the damage to the wire rope W due to adhesion of a magnetic foreign matter and the damage to the wire rope W due to a disconnection of the wire, the damage waveform Wd exhibits mutually different polarities. Specifically, in the damage to the wire rope W due to adhesion of a magnetic foreign matter and in the damage to the wire rope W due to a disconnection of the wire, the order of polarity of the both-side waveform as a damage waveform Wd is opposite. This is because in the case of the damage due to adhesion of a magnetic foreign matter to the wire rope W, the cross-sectional area of the wire rope W is increased, resulting in an increased magnetic flux, while in the case of the damage to the wire rope W due to a disconnection of the wire, the cross-sectional area of the wire rope W is reduced, resulting in a decreased magnetic flux.

For this reason, the processing unit 202 of the processing device 200 can determine, based on the polarity (the order of polarity of the both-side waveform as a damage Wd) of the damage waveform Wd, that the type of damage to the wire rope W is which of the damage to the wire rope W caused by adhesion of a magnetic foreign matter and the damage to the wire rope W due to a disconnection of the wire.

Note that in the damage to the wire rope W caused by adhesion of a magnetic foreign matter and the damage to the wire rope W due to a disconnection of the wire, the order of polarity indicated by the damage waveform Wd is not limited to the example shown in FIG. 4. In these damages, the order of polarity shown by the damage waveform Wd may be reversed from that shown in FIG. 4. This is because the order of polarity indicated by the damage waveform Wd is determined by taking the difference between the signals as a reference which of the pair of receiving coils 12a and 12b of the differential coil 12.

After determining the type of damage to the wire rope W, the processing unit 202 of the processing device 200 outputs the determination results (elongation with plastic deformation, adhesion of a magnetic foreign matter, a disconnection of the wire, etc.) on the type of damage to the wire rope W. For example, the processing unit 202 of the processing device 200 outputs the determination results on the type of damage to the wire rope W to the display unit 204 and displays the determination results on the type of damage to the wire rope W on the display unit 204. For example, the processing unit 202 of the processing device 200 outputs the determination results on the type of damage to the wire rope W to the device (such as an elevator) in which the inspected wire rope W is used, and causes the device to perform an operation (such as a stopping operation) according to the determination results on the type of damage to the wire rope W.

(Effects of First Embodiment)

In this first embodiment, the following effects can be acquired.

In the first embodiment, as described above, the processing device 200 is configured to extract the feature amount from the measured damage waveform Wd and determine the type of damage to the wire rope W based on the comparison between the extracted feature amount and the feature amount stored in advance in the storage unit 203.

As a result, when determining the type of damage to the wire rope W, it is possible to easily determine the type of damage to the wire rope W by utilizing the fact that the feature amount of the damage waveform Wd differs depending on the type of damage to the wire rope W. Consequently, it is possible to provide a magnetic body inspection system 300 which can easily determine the type of damage to the wire rope W.

In the first embodiment, as described above, the processing device 200 is configured to extract at least one of the length L of the damage waveform Wd in the time axis direction and the polarity of the damage waveform Wd as a feature amount from the damage waveform Wd.

With this, when determining the type of damage to the wire rope W by extracting the length L of the damage waveform Wd in the time axis direction as a feature amount, it is possible to easily determine the type of damage to the wire rope W by utilizing the fact that the length L of the damage waveform Wd in the time axis direction differs depending on the type of damage to the wire rope W. Further, when determining the type of damage to the wire rope W by extracting the polarity of the damage waveform Wd as a feature amount, it is possible to easily determine the type of damage to the wire rope W by utilizing the fact that the polarity of the damage waveform Wd differs depending on the type of damage to the wire rope W.

Further, in the first embodiment, as described above, the processing device 200 is configured to determine, based on the length L of the damage waveform Wd in the time axis direction and the polarity of the damage waveform Wd, that the type of damage to the wire rope W is damage to the wire rope W due to a disconnection of the wire or damage to the wire rope W other than damage to the wire rope W due to a disconnection of the wire.

Here, the present inventor has acquired a new finding that in the case of damage to the wire rope W due to disconnection of the wire, the range of the damage is relatively small, and therefore the length L of the damage waveform Wd in the time axis direction is relatively small. Further, the inventor of the present application has acquired a new finding that in the case of damage to the wire rope W due to disconnection of the wire, the cross-sectional area of the wire rope W is reduced, causing a reduction of the magnetic flux, which results in that the damage waveform Wd exhibits a characteristic polarity corresponding to this reduction of the magnetic flux.

Therefore, by configuring as described above, in the case of the damage waveform Wd indicating the damage to the wire rope W due to disconnection of the wire, by utilizing the fact that the length L of the damage waveform Wd in the time axis direction is relatively small and a characteristic polarity corresponding to the reduction of the magnetic flux is exhibited, it is possible to easily determine that the type of the damage to the wire rope W is damage to the wire rope W due to disconnection of the wire or damage to the wire rope W other than damage to the wire rope W due to disconnection of the wire.

Further, in the first embodiment, as described above, the processing device 200 is configured to determine, based on the length L of the damage waveform Wd in the time axis direction and the polarity of the damage waveform Wd, that the type of damage to the wire rope W is damage to the wire rope W due to a disconnection of the wire or damage to the wire rope W due to adhesion of a magnetic foreign matter. The processing device 200 is configured to determine, based on the length L of the damage waveform Wd in the time axis direction, that the type of damage to the wire rope W is damage to the wire rope W due to elongation with plastic deformation.

Here, the inventor of the present application has acquired a new finding that in the case of damage to the wire rope W due to adhesion of a magnetic foreign matter, such as, e.g., a broken piece, the range of the damage is relatively small and therefore the length L of the damage waveform Wd in the time axis direction is relatively small. Further, the present inventor has acquired a new finding that in the case of damage to the wire rope W due to adhesion of a magnetic foreign matter, the cross-sectional area of the wire rope W is increased, resulting in an increased magnetic flux and therefore the damage waveform Wd exhibits a characteristic polarity corresponding to the increase in this magnetic flux.

Therefore, by configuring as described above, by utilizing the fact that the length L of the damage waveform Wd in the time axis direction is relatively small and a characteristic polarity corresponding to the increase in the magnetic flux is exhibited in the damage waveform Wd indicating the damage to the wire rope W due to adhesion of the magnetic foreign matter, and by utilizing the fact that the length L of the damage waveform Wd in the time axis direction is relatively small and a characteristic polarity corresponding to the decrease in the magnetic flux in the damage waveform Wd indicating the damage to the wire rope W due to disconnection of the wire, it is possible to easily determine that the type of damage to the wire rope W is damage to the wire rope W due to disconnection of the wire or damage to the wire rope W due to adhesion of the magnetic foreign matter.

Further, the inventor of the present application has acquired a new finding that in the case of damage to the wire rope W due to elongation with plastic deformation caused by a kink or the like, the range of the damage is relatively large and therefore the length of the damage waveform Wd in the time axis direction is relatively large. Therefore, by configuring as described above, by utilizing the fact that the length L of the damage waveform Wd in the time axis direction is relatively large in the damage waveform Wd indicating the damage to the wire rope W due to elongation with plastic deformation, it is possible to easily determine that the type of damage to the wire rope W is damage to the wire rope W due to elongation with plastic deformation.

Also, in the first embodiment, as described above, the processing device 200 is configured to determine, based on the length L of the damage waveform Wd in the time axis direction, that the type of damage to the wire rope W is damage to the wire rope W due to elongation with plastic deformation.

Here, the inventor of the present application has acquired a new finding that in the case of damage to the wire rope W due to elongation with plastic deformation caused by a kink or the like, the range of the damage is relatively large and therefore the length L of the damage waveform Wd in the time axis direction is relatively large.

Therefore, by configuring as described above, by utilizing the fact that the length L of the damage waveform Wd in the time axis direction in the damage waveform Wd indicating the damage to the wire rope W due to elongation with elastic deformation, it is possible to easily determine that the type of damage to the wire rope W is the damage waveform Wd indicating the damage to the wire rope W due to elongation with plastic deformation.

In the first embodiment, as described above, the detection unit 1 is configured to include the differential coil 12. Further, the processing device 200 is configured to determine the type of damage to the wire rope W, based on at least one of the length L of the damage waveform Wd in the time axis direction detected by the differential coil 12 of the detection unit 1 and the polarity of the damage waveform Wd.

With this, it is possible to determine the type of damage to the wire rope W based on the damage waveform Wd acquired by the differential coil 12 with less noise. Therefore, it is possible to determine the type of damage to the wire rope W with higher accuracy. Further, the inventor of the present application has acquired a new finding that by using the differential coil 12, it is possible to easily discriminate between damage to the wire rope W due to a disconnection of the wire and damage to the wire rope W due to adhesion of a magnetic foreign matter.

In the first embodiment, as described above, the damage waveform Wd is a both-side waveform having two waveform portions whose polarity is opposite to each other. The processing device 200 is configured to determine the type of damage to the wire rope W based on at least one of the length L of the both-side waveform in the time axis direction as a damage waveform Wd ad the order of polarity of the both-side waveform as a damage waveform Wd.

Thus, the inventor of the present application has found that the type of damage to the wire rope W can be easily determined by utilizing the fact that the length L of the both-side waveform in the time axis direction as a damage waveform Wd differs depending on the type of damage to the wire rope W, or by utilizing the fact that the order of polarity of the both-side waveform as a damage waveform Wd differs depending on the type of damage to the wire rope W.

Second Embodiment

Next, with reference to FIG. 1 and FIG. 5, a second embodiment will be described. In the second embodiment, unlike the above-described first embodiment in which the damage waveform is a both-side waveform, an example in which the damage waveform is an integrated waveform acquired by integrating the both-side waveform will be described. Note that the same configuration as that of the above-described first embodiment is denoted by the same reference numeral in the drawings, and the description thereof will be omitted.

(Configuration of Magnetic Body Inspection System)

A magnetic body inspection system 600 differs from the magnetic body inspection system 300 of the above-described first embodiment in that a processing device 500 is provided, as shown in FIG. 1. The processing device 500 differs from the processing device 200 of the first embodiment in that a processing unit 502 is provided.

Figure 5:
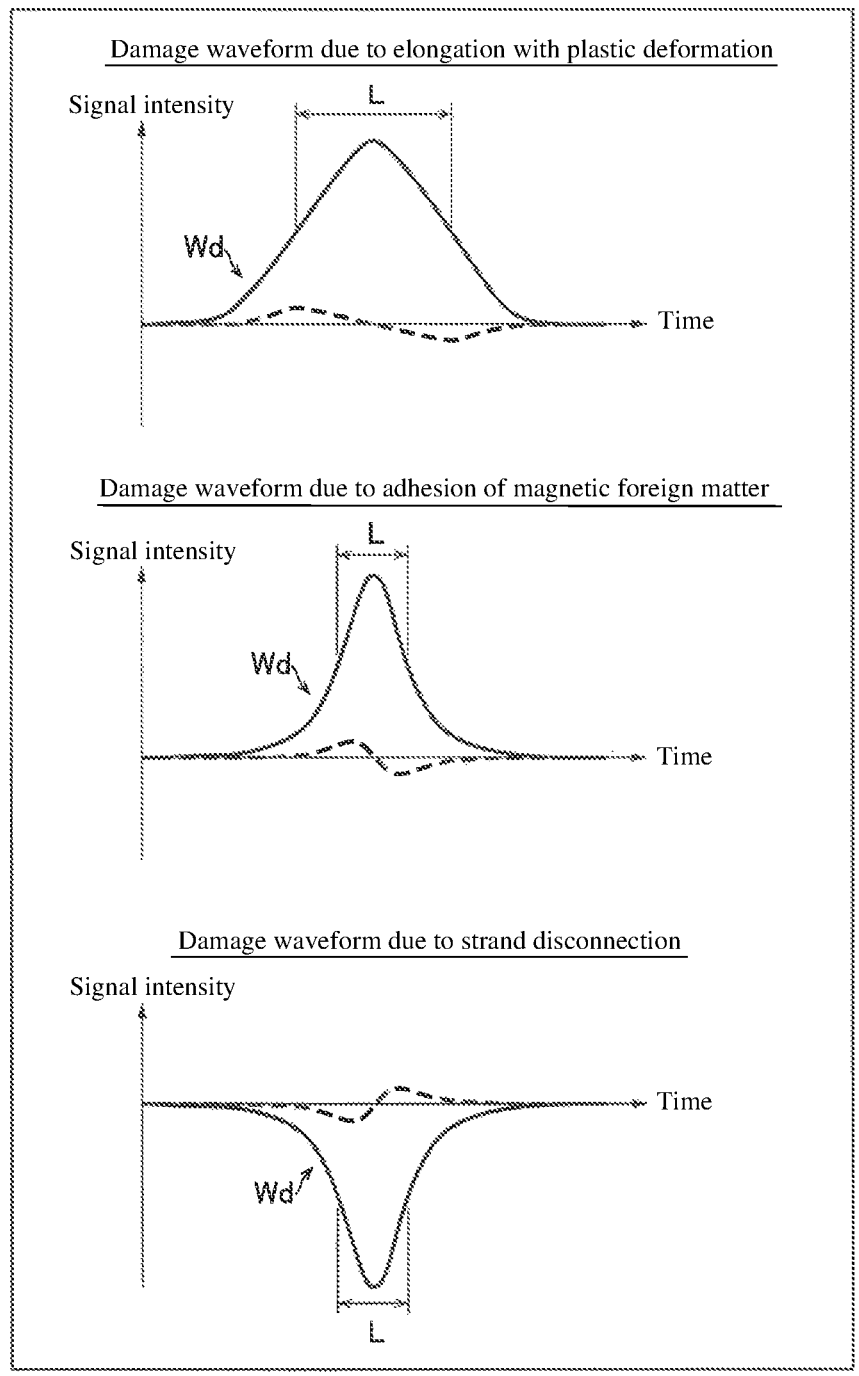
FIG. 5 is a diagram showing an integrated waveform as a damage waveform.

In the second embodiment, as shown in FIG. 5, the damage waveform Wd is an integrated waveform having a single mountain shape acquired by integrating the both-side waveform in the time axis direction. The processing unit 502 of the processing device 500 converts the both-side waveform as a damage waveform Wd into an integrated waveform as a damage waveform Wd by integrating it in the time axis direction.

In FIG. 5, the integrated waveform is indicated by a solid line and the original both-side waveform is indicated by a broken line for ease of comprehension.

The processing unit 502 of the processing device 500 determines the type of damage to the magnetic body based on at least one of the length L of the integrated waveform as a damage waveform Wd in the time axis direction and the polarity of the integrated waveform as a damage waveform Wd. The length L of the integrated waveform as a damage waveform Wd in the time axis direction is, for example, the half-width of the integrated waveform.

For example, the processing unit 502 of the processing device 500 determines that the type of damage to the wire rope W is damage to the wire rope W due to elongation with plastic deformation, based on the length L of the damage waveform Wd in the time axis direction. The processing unit 502 of the processing device 500 determines, when the length L of the damage waveform Wd in the time axis direction is equal to or greater than a predetermined third threshold, that the type of damage to the wire rope W is damage to the wire rope W due to elongation with plastic deformation. The third threshold is acquired in advance by experiments or the like.

For example, the processing unit 502 of the processing device 500 determines, based on the length L of the damage waveform Wd in the time axis direction and the polarity of the damage waveform Wd, that the type of damage to the wire rope W is damage to the wire rope W due to adhesion of a magnetic foreign matter. The processing unit 502 of the processing device 500 determines, when the length L of the damage waveform Wd in the time axis direction is less than a predetermined fourth threshold (<third threshold) and the polarity of the integrated waveform as a damage waveform Wd is a predetermined first polarity (in FIG. 5, convex upward), that the type of damage to the wire rope W is damage to the wire rope W due to adhesion of a magnetic foreign matter. The fourth threshold is acquired in advance by experiments or the like.

For example, the processing unit 502 of the processing device 500 determines, based on the length L of the damage waveform Wd in the time axis direction and the polarity of the damage waveform Wd, that the type of damage to the wire rope W is damage to the wire rope W due to a disconnection of the wire. The processing unit 502 of the processing device 500 determines that the type of damage to the wire rope W is damage to the wire rope W due to a disconnection of the wire when the length L of the damage waveform Wd in the time axis direction is less than a predetermined fourth threshold and the polarity of the integrated waveform as a damage waveform Wd is a predetermined second polarity (in FIG. 5, convex downward, polarity opposite to the first polarity).

Also in the integrated waveform, similarly to the original both-side waveform, in the case of damage to the wire rope W due to elongation with plastic deformation due to a kink or the like, the length L of the damage waveform Wd in the time axis direction is about several times as compared with the damage to the wire rope W due to adhesion of a magnetic foreign matter or a disconnection of the wire.

Thus, the processing unit 502 of the processing device 500 can determine, based on the length L of the integrated waveform as a damage waveform Wd in the time axis direction, whether the type of damage to the wire rope W is damage to the wire rope W due to elongation with plastic deformation or damage other than damage to the wire rope W due to elongation with plastic deformation (damage to the wire rope W due to adhesion of a magnetic foreign matter or a disconnection of the wire).

Similarly, the processing unit 502 of the processing device 500 can determine, based on the length L of the integrated waveform as a damage waveform Wd in the time axis direction, whether the damage to the wire rope W is damage to the wire rope W due to adhesion of a magnetic foreign matter or a disconnection of the wire or damage other than damage to the wire rope W due to adhesion to a magnetic foreign matter or a disconnection of the wire (damage to the wire rope W due to elongation with plastic deformation).

Also in the integrated waveform, similarly to the original both-side waveform, in the case of damage to the wire rope W due to adhesion of a magnetic foreign matter and in the case of damage to the wire rope W due to a disconnection of the wire, the damage waveform Wd exhibits different polarity. Specifically, in the case of damage to the wire rope W due to adhesion of a magnetic foreign matter and in the case of damage to the wire rope W due to a disconnection of the wire, the polarity of the integrated waveform is reversed as the damage waveform Wd.

Therefore, the processing unit 502 of the processing device 500 can determine whether the type of damage to the wire rope W is damage to the wire rope W due to adhesion of a magnetic foreign matter or damage to the wire rope W due to a disconnection of the wire based on the polarity of the integrated waveform as a damage waveform Wd.

Note that in the case of damage to the wire rope W due to adhesion of a magnetic foreign matter and damage to the wire rope W due to a disconnection of the wire, the polarity indicated by the damage waveform Wd is not limited to the example shown in FIG. 5. In these damages, the polarity exhibited by the damage waveform Wd may be reversed from that shown in FIG. 5. The polarity indicated by the damage waveform Wd is determined by taking the difference between the signals as a reference which of the pair of receiving coils 12a and 12b of the differential coil 12.

The rest of the configuration of the second embodiment is the same as that of the first embodiment.

(Effects of Second Embodiment)

In this second embodiment, the following effects can be acquired.

In the second embodiment, as described above, the damage waveform Wd is an integrated waveform having a single mountain shape acquired by integrating the both-side waveform having two waveform portions opposite in the polarity in the time axis direction. The processing device 500 is configured to determine the type of damage to the wire rope W based on at least one of the length L of the integrated waveform as a damage waveform Wd in the time axis direction and the polarity of the integrated waveform as a damage waveform Wd.

With this, the inventor of the present application has found that the type of damage to the wire rope W can be easily determined by utilizing the fact that the length of the integrated waveform as a damage waveform Wd in the time axis direction differs depending on the type of damage to the wire rope W, or by utilizing the fact that the polarity of the integrated waveform as a damage waveform Wd differs depending on the type of damage to the wire rope W.

The other effects of the second embodiment are the same as those of the above-described first embodiment.

Third Embodiment

Next, with reference to FIG. 1 to FIG. 5, a third embodiment will be described. In this third embodiment, unlike the above-described first embodiment in which the processing unit determines the type of damage to the wire rope, an example in which a magnetic body inspection device determines the type of damage to the wire rope. Note that the same configuration as that of the above-described first embodiment is denoted by the same reference numeral in the figures, and the description thereof will be omitted.

(Configuration of Magnetic Body Inspection System)

The magnetic body inspection system 900 differs from the magnetic body inspection system 300 of the above-described first embodiment in that a magnetic body inspection device 700 and a processing device 800 are provided as shown in FIG. 1 to FIG. 3. Further, the magnetic body inspection device 700 and the processing device 800 differ from the magnetic body inspection device 100 and the processing device 200 of the above-described first embodiment in that they are each provided with a processing unit 631 and 802.

In the third embodiment, in the storage unit 35, the relation between the type of damage and the feature amount of the damage waveform Wd indicating the damage to the wire rope W among measurement waveforms is stored in advance. Further, the processing unit 631 of the magnetic body inspection device 700 extracts the feature amount from the measured damage waveform Wd, and determines (estimates) the type of damage to the wire rope W based on the comparison between the extracted feature amount and the feature amount stored in the storage unit 35. The processing unit 631 of the magnetic body inspection device 700 extracts at least one the length L of the damage waveform Wd in the time axis direction and the polarity of the damage waveform Wd as a feature amount from the damage waveform Wd. Further, the processing unit 631 of the magnetic body inspection device 700 determines the type of damage to the wire rope W based on at least one of the length L of the extracted damage waveform Wd in the time axis direction and the polarity of the damage waveform Wd.

The processing unit 631 of the magnetic body inspection device 700 may determine the type of damage to the wire rope W based on the both-side waveform as a damage waveform Wd in the same manner as in the first embodiment (see FIG. 4). The processing unit 631 of the magnetic body inspection device 700 may determine the type of damage to the wire rope W based on the integrated waveform as a damage waveform Wd in the same manner as in the above-described second embodiment (see FIG. 5).

Also in the third embodiment, the method for determining the type of damage to the wire rope W is the same as in the first embodiment or second embodiment. Therefore, the detailed description will be omitted.

After determining the type of damage to the wire rope W, the processing unit 631 of the magnetic body inspection device 700 outputs the determination results (elongation with plastic deformation, adhesion of a magnetic foreign matter, a disconnection of the wire, etc.) of the type of damage to the wire rope W.

For example, the processing unit 631 of the magnetic body inspection device 700 outputs the determination results on the type of damage to the wire rope W to the processing device 800. The processing unit 802 of the processing device 800 outputs, for example, the determination results on the type of damage to the wire rope W from the magnetic body inspection device 700 to the display unit 204, and displays the determination result on the type of damage to the wire rope W on the display unit 204. For example, the processing unit 631 of the magnetic body inspection device 700 outputs the determination results on the type of damage to the wire rope W to a device (such as elevator) in which the inspected wire rope W is used, and causes the device to perform an operation (such as a stopping operation) according to the determination results on the type of damage to the wire rope W.

The rest of the configuration of the third embodiment is the same as that of the first embodiment.

(Effects of Third Embodiment)

In the third embodiment, the following effects can be acquired.

In third embodiment, as described above, the magnetic body inspection device 700 is configured to include a processing unit 631 for extracting a feature amount from the measured damage waveform Wd and determining the type of damage to the wire rope based on the comparison between the extracted feature amount and the feature amount stored in advance in the storage unit 35. This makes it possible to provide a magnetic body inspection device 700 capable of easily determining the type of damage to the wire rope W based on the new findings by the inventor of the present application, similarly to the above-mentioned first embodiment.

The other effects of the third embodiment are the same as those of the first embodiment.

Modification

It should be understood that the embodiments disclosed here are examples in all respects and are not restrictive. The scope of the present invention is shown in the claims rather than by the above-described embodiments, and the scope of the present invention includes all modifications (modified examples) within the meanings and ranges equivalent to the claims.

For example, in the first to third embodiments described above, an example is shown in which the magnetic body inspected by the magnetic body inspection system is a wire rope, but the present invention is not limited thereto. In the present invention, the magnetic body to be inspected by the magnetic body inspection system may be a magnetic body other than a wire rope.

In the above-described first to third embodiments, an example is shown in which a wire rope, which is an inspection target, is used for cranes, elevators, suspension bridges, robots, etc., but the present invention is not limited thereto. In the present invention, the wire rope (magnetic body), which is an inspection target, may be used in addition to cranes, elevators, suspension bridges, and robots.

In the above-described first to third embodiments, an example is shown in which the detection unit includes a differential coil having a pair of receiving coils, but the present invention is not limited thereto.

For example, the detection unit may include a detection coil composed of a single coil. Even in the case of detecting the magnetic flux of a wire rope (magnetic body) by a detection coil composed of a single coil, the length of the damage waveform in the time axis direction differs depending on the type of damage to the magnetic body. Therefore, the type of damage to the wire rope (magnetic body) can be determined based on the length of the damage waveform in the time axis direction.

In addition, in the above-described first to third embodiments, and example is shown in which three damages, i.e., the damage to the wire rope due to elongation with plastic deformation, the damage to the wire rope due to adhesion of a magnetic foreign matter, and the damage to the wire rope due to a disconnection of the wire, are determined (estimated) based on at least one of the length of the damage waveform in the time axis direction and the polarity of the damage waveform, but the present invention is not limited thereto. The present invention is not necessarily required to determine (estimate) all three damages.

For example, at least one of the three damages may be determined. The present invention may determine damage other than the three damages based on at least one of the length of the damage waveform in the time axis direction and the polarity of the damage waveform. For example, based on at least one of the length of the damage waveform in the time axis direction and the polarity of the damage waveform, damage to the wire rope due to press (compressing against the wire rope) may be determined.

The invention claimed is:

1. A magnetic body inspection system comprising:
a magnetic body inspection device configured to acquire a measurement waveform by detecting a magnetic flux of a magnetic body by a detection unit while relatively moving the detection unit with respect to the magnetic body;

a storage unit configured to store a relation between a stored feature amount of a damage waveform indicating damage and a type of damage in advance; and a processing unit configured to extract a first feature amount of a measured damage waveform of the measurement waveform and determine the type of the damage to the magnetic body based on a comparison between the extracted first feature amount and the stored feature amount stored in the storage unit in advance, wherein the processing unit is configure to extract as the first feature amount from the measured damage waveform a length of the measured damage waveform in a time axis direction and a polarity of the measured damage waveform and configured to determine the type of damage to the magnetic body based on the length of the measured damage waveform in the time axis direction and the polarity of the measured damage waveform.

2. The magnetic body inspection system as recited in claim 1, wherein the magnetic body is a wire rope formed of a plurality of wires, and wherein the processing unit is configured to determine that the type of the damage to the wire rope is either damage to the wire rope due to a disconnection of a wire of the plurality of wires or damage to the wire rope other than the damage to the wire rope due to a disconnection of the wire, based on the length of the measured damage waveform in the time axis direction and the polarity of the measured.

3. The magnetic body inspection system as recited in claim 2, wherein the processing unit is configured to determine that the type of the damage to the wire rope is either damage to the wire rope due to the disconnection of the wire or damage to the wire rope due to adhesion of a magnetic foreign matter, based on the length of the measured damage waveform in the time axis direction and the polarity of the measured damage waveform, and wherein the processing unit is configured to determine that the type of the damage to the wire rope is damage to the wire rope due to elongation with plastic deformation based on the length of the measured damage waveform in the time axis direction.

4. The magnetic body inspection system as recited in claim 1, wherein the detection unit includes a differential coil, and wherein the processing unit is configured to determine the type of the damage to the magnetic body based on at least one of the length of the measured damage waveform in the time axis direction and the polarity of the measured detected by the differential coil of the detection unit.

5. The magnetic body inspection system as recited in claim 2, wherein the measured damage waveform is a both-side waveform having two waveform portions opposite in polarity to each other, and wherein the processing unit is configured to determine the type of the damage to the magnetic body based on at least one of the length of the both-side waveform in the time axis direction as the measured damage waveform and an order of polarity of the both-side waveform as the measured damage waveform.

6. The magnetic body inspection system as recited in claim 2, wherein the measured damage waveform is an integrated waveform having a single mountain shape acquired by integrating a both-side waveform having two waveform portions opposite in the polarity to each other in the time axis direction, and wherein the processing unit is configured to determine the type of the damage to the magnetic body based on at least one of the length of the integrated waveform in the time axis direction length as the measured damage waveform and the polarity of the integrated waveform as the measured damage waveform.

7. The magnetic body inspection system as recited in claim 1, wherein the processing unit is configured to determine that the type of the damage to the wire rope is a wire disconnection of one or more wires of the wire rope.

8. The magnetic body inspection system as recited in claim 1, wherein the processing unit is configured to determine that the type of the damage to the wire rope is damage to the wire rope due to adhesion of a magnetic foreign matter to the wire rope.

9. The magnetic body inspection system as recited in claim 1, wherein the processing unit is configured to determine that the type of the damage to the wire rope is damage to the wire rope due to elongation of the wire rope.

10. A magnetic body inspection device comprising:

a detection unit configured to acquire a measurement waveform by detecting a magnetic flux of the magnetic body while being relatively moved relative to the magnetic body;

a storage unit configured to store a relation between a stored feature amount of a damage waveform indicating damage and a type of the damage; and a processing unit configured to extract a first feature amount from a measured damage waveform of the measurement waveform and determine the type of the damage to the magnetic body based on a comparison between the extracted first feature amount and the stored feature amount stored in the storage in advance, wherein the processing unit is configured to extract as the first feature amount from the measured damage waveform a length of the measured damage waveform in a time axis direction and a polarity of the measured damage waveform and configured to determine the type of damage to the magnetic body based on the length of the measured damage waveform in the time axis direction and the polarity of the measured damage waveform.

11. The magnetic body inspection device as recited in claim 10, wherein the processing unit is configured to determine that the type of the damage to the wire rope is a wire disconnection of one or more wires of the wire rope.

12. The magnetic body inspection system as device in claim 10, wherein the processing unit is configured to determine that the type of the damage to the wire rope is damage to the wire rope due to adhesion of a magnetic foreign matter to the wire rope.

13. The magnetic body inspection system as device in claim 10, wherein the processing unit is configured to determine that the type of the damage to the wire rope is damage to the wire rope due to elongation of the wire rope.

14. A magnetic body inspection method, comprising:

acquiring a measurement waveform by detecting a magnetic flux of a magnetic body by a detection unit while relatively moving the detection unit with respect to the magnetic body;

extracting a first feature amount from a damage waveform of the acquired measurement waveform indicating damage to the magnetic body; and determining the type of the damage to the magnetic body based on a comparison between the extracted first feature amount and a stored feature amount stored in a storage unit in advance, the storage unit storing the relation between the stored feature amount and the type of damage in advance, wherein the first feature amount extracted from the measured damage waveform is a length of the measured damage waveform in a time axis direction and a polarity of the measured damage waveform, and the type of damage to the magnetic body based on the length of the measure damage waveform in the time axis direction and the polarity of the measured damage waveform.

15. The magnetic body inspection method as recited in claim 14, wherein determining the type of the damage to the magnetic body comprises determining that the type of the damage to the wire rope is a wire disconnection of one or more wires of the wire rope.

16. The magnetic body inspection method as recited in claim 14, wherein determining the type of the damage to the magnetic body comprises determining that the type of the damage to the wire rope is damage to the wire rope due to adhesion of a magnetic foreign matter to the wire rope.

17. The magnetic body inspection method as recited in claim 14, wherein determining the type of the damage to the magnetic body comprises determining that the type of the damage to the wire rope is damage to the wire rope due to elongation of the wire rope.

* * * * *